(No Model.)
J. H. ROUSE.
HARROW.
No. 468,551. Patented Feb. 9, 1892.
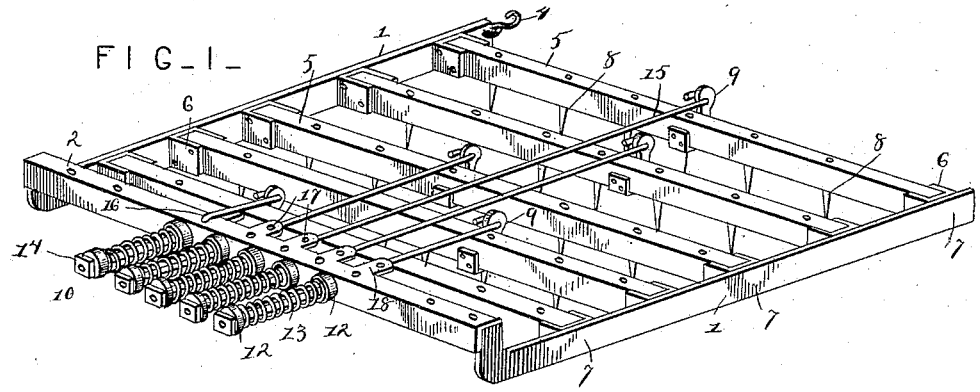
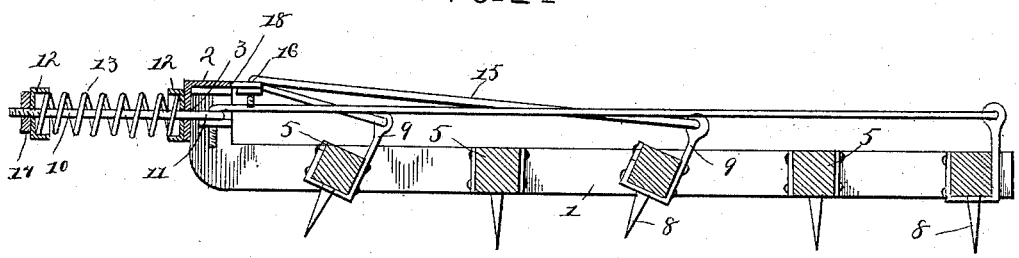
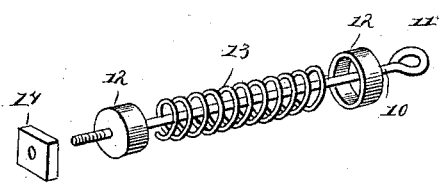
Witnesses:
Geo. E. Frech.
W. S. Duvall.
Inventor
John H. Rouse
By his Attorneys,
C. A. Snow & Co.

UNITED STATES PATENT OFFICE.

JOHN HENRY ROUSE, OF ADVANCE, MISSOURI.

HARROW.

SPECIFICATION forming part of Letters Patent No. 468,551, dated February 9, 1892.

Application filed February 19, 1891. Serial No. 382,034. (No model.)

*To all whom it may concern:*

Be it known that I, JOHN HENRY ROUSE, a citizen of the United States, residing at Advance, in the county of Stoddard and State of Missouri, have invented a new and useful Harrow, of which the following is a specification.

This invention relates to improvements in harrows; and the objects in view are to provide a harrow combining the characteristics and qualities of what are known as the "spring-tooth," the "rigid tooth," and the "inclined rigid tooth."

Other objects and advantages of the invention will appear in the following description, and the novel features thereof will be particularly pointed out in the claims.

Referring to the drawings, Figure 1 is a perspective of a harrow constructed in accordance with my invention. Fig. 2 is a longitudinal section. Fig. 3 is a detail of one of the spring-bolts.

Like numerals of reference indicate like parts in all the figures of the drawings.

1 designates the opposite side bars of the harrow-frame, which have their rear ends upwardly curved and connected by a rear bar 2, preferably formed of angle-iron and provided at intervals in their vertical halves with a series of openings 3. The front ends of the side bars are provided with draft-clevises 4, to which the team may be hitched.

5 designates a series of harrow-bars, each of which is fitted at its ends with a suitable cap or casting 6, through which and the side bars are passed pivot-bolts 7. Each of the bars 5 is provided with a series of rigid depending teeth 8 and with a perforated standard 9, said standards of the several bars being differently located, as shown.

In each of the perforations of the rear bar is mounted a bolt 10, which terminates at its front end in an eye 11 and has its rear end screw-threaded. A pair of concaved caps 12 is mounted upon each bolt, the concaved faces of the caps being inwardly disposed, and interposed between each pair and encircling the bolt is a coiled spring 13, the same being placed under tension by means of a nut 14, threaded on the end of the eyebolt. These eyebolts constitute spring-links and serve as a yielding connection between the transverse bar 2 and the standard 9 of each harrow-bar, the connection being made by means of rods 15, the rear ends of which terminate in hooks 16, upon which are threaded nuts for retaining them in engagement with the eyebolts, and the front ends of which are bent to engage the perforated standards 9 of the harrow-bars. The rear bar 2 is provided with a series of forwardly-disposed straps 18, each of which is provided with a perforation 17, and, if desired, the hook ends of the connecting-rod may be disconnected from the eyebolt and inserted into one of the perforated straps. When connected to the eyebolts by the rods, any obstructions met with by the harrow-teeth may be readily passed over by the yielding of the teeth, so that the teeth operate in the same manner as does the well-known spring-tooth. The tension of the spring may be regulated by manipulating the nuts 14, so that the rigidity of the harrow-bars may be regulated in accordance with the soil to be operated upon. By disconnecting the rods and connecting the same with the perforated straps the harrow-bars are tilted by reason of the bars being located in front of the eyebolt and are held rigidly in this tilted position, thus forming a harrow with inclined harrow-teeth and rigid harrow-bars. A series of perforations 17 is also formed in the rear bar upon the upper side of the same and directly over the eyes of the eyebolts, and by inserting the ends of the rod in these perforations a rigid vertical-tooth harrow is provided.

From the above construction it will be seen that I combine in one structure the three well-known types of harrows and that the convergence from one type to another may be accomplished with ease and facility.

Having described my invention, what I claim is—

1. In a harrow, the combination, with a harrow-frame having a rear cross-bar provided with two series of openings, one in advance of the other, of a series of axially-pivoted harrow-bars and rods connected to the bars and at their rear ends bent to form hooks for engaging either of the openings, substantially as specified.

2. In a harrow, the combination, with the opposite side bars, the rear perforated transverse bar, and a series of axially-pivoted harrow-bars having rigid harrow-teeth and perforated standards, of eyebolts mounted in the lower perforations of the rear bar, pairs of concaved caps mounted upon each of the eyebolts, coiled springs mounted between the caps, tension-nuts mounted on the bolts in rear of the springs, and hook-shaped rods connected to the standards of the harrow-bars, removably connected to the eyebolts, and adapted for connection with perforations formed in the rear bar immediately above and in advance of the eyes of the eyebolts, substantially as specified.

In testimony that I claim the foregoing as my own I have hereto affixed my signature in presence of two witnesses.

JOHN HENRY ROUSE.

Witnesses:
JAMES W. BURKS,
JOHN T. STRATMAN, Jr.